Aug. 6, 1929.  W. H. SIPPEL  1,723,085

TRAILER TRUCK

Filed March 28, 1927

INVENTOR.
WILLIAM H. SIPPEL.

BY
Lukens & Lukens
Goldsmith & Salt
ATTORNEYS.

Patented Aug. 6, 1929.

1,723,085

UNITED STATES PATENT OFFICE.

WILLIAM H. SIPPEL, OF SOUTH BEND, INDIANA.

TRAILER TRUCK.

Application filed March 28, 1927. Serial No. 178,863.

This invention relates to trailer type trucks.

The chief object of this invention is to provide a trailer type truck with certain improvements which reduces the number of parts without reducing the strength and which secures increased strength by the employment of other parts.

One feature of the invention consists in the knockdown and unit assembly arrangement. The caster wheel support is detachable from the main bed and the trailing wheel and support are also detachable therefrom. In large shipments the beds may be shipped in flat and the caster and trailing wheels in opposed relation, thereby reducing the shipping space required.

Figure 1:
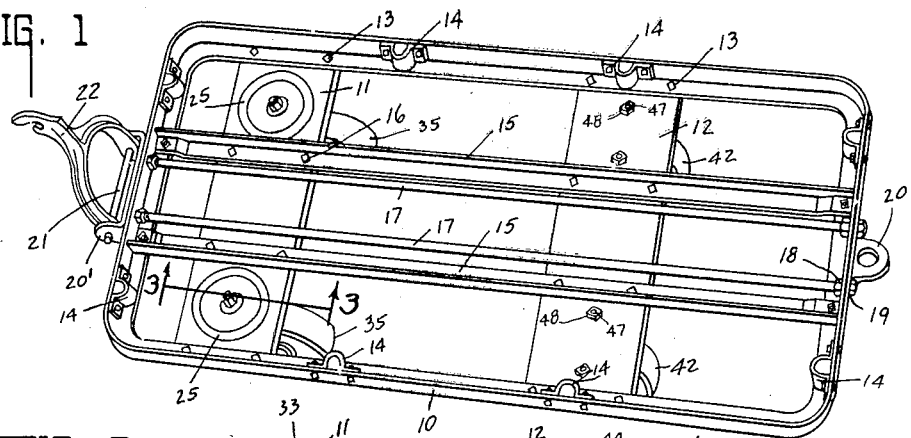
Figure 2:
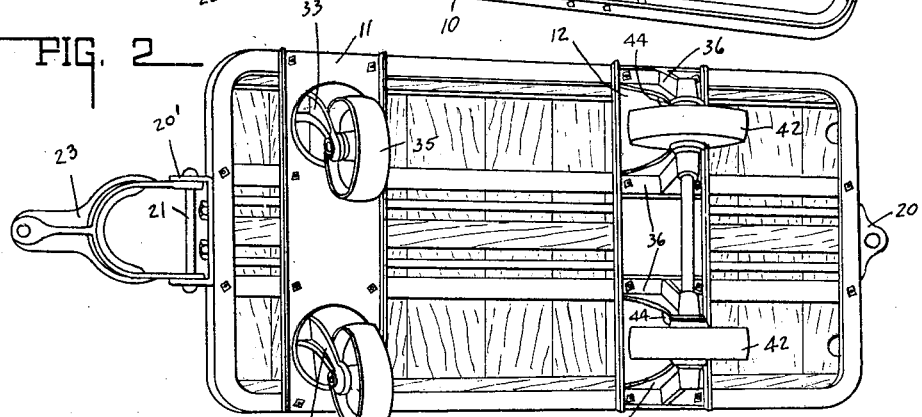
Figure 3:
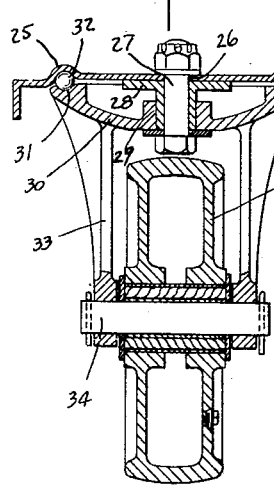
Figure 4:
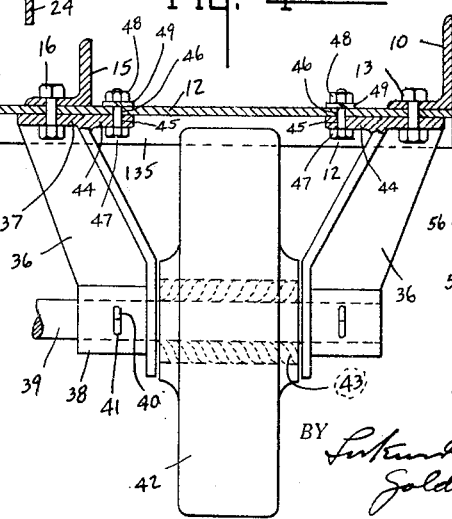
Figure 5:
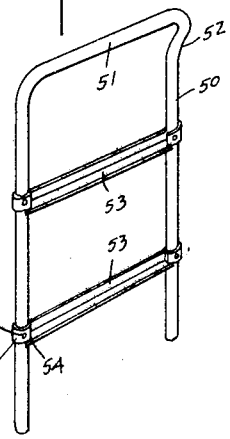

The full nature of the invention will be understood from the accompanying drawings and the following description and claims:

Fig. 1 is a perspective view of the top of the framework of the trailer truck with the flooring or bed and gates removed. Fig. 2 is a perspective view of the bottom of the truck trailer. Fig. 3 is a central sectional view through the caster wheel construction. Fig. 4 is a central sectional view through the trailer wheel construction. Fig. 5 is a perspective view of one of the gates.

In the drawings 10 indicates an angle iron framework that is substantially rectangular with the horizontal flange extending inwardly and forming a ledge to receive the truck bed or floor. To the under-face of the rectangular frame member 10, a pair of transverse supports 11 and 12 is secured thereto as at 13. The frame also supports at the front and rear and at each side pairs of sockets 14 for receiving the side gate or end gate shown in Fig. 5.

A pair of angle members 15 extend longitudinally of the frame 10 and are secured at their opposite ends to said frame through an offset portion as shown, and thus the main body of the angle lies substantially in the same plane as the inwardly extending face or flange of the angular framework 10. The transverse members 11 and 12 are secured as at 16 to the elongated angle irons 15. In addition to the foregoing there is provided a pair of rods 17 which by means of the inner nuts 18 and the outer nuts 19 or equivalent means, serve as push and pull rods for transmitting compression and tension. At the rear of the truck there is secured an eye member 20. The nuts 19 and extensions of rods 17 serve as the anchorage therefor. Similarly, a U-shaped strap 20' is mounted upon the opposite ends of the rods 17 and supports the rod 21 extending transversely therethrough which constitutes a pivotal retainer for a connector herein shown in the form of a yoke-shaped hook 22 in Fig. 1 and as a yoke-shaped eye member 23 in Fig. 2. Thus, pushing or pulling forces applied to the frame will be transmitted through the rods 17 without frame deformation.

As shown in Figs. 1 to 3 inclusive, the transverse member 11 is channel-shaped by the addition of flanges 24 which secures rigidity of construction. Herein said transverse member 11 is provided with a pair of annular grooves 25 and coaxial openings 26. Extending through each opening 26 is a pin 27 mounted in a flanged bushing 28 which pivotally supports the collar 29 of a yoke 30 having an upper annular groove 31 in alignment with the groove 25, and intermediate the same is positioned the anti-friction balls 32. The yoke 30 mounts between the arms 33 on pin 34 the usual caster wheel 35. The axis of pin or pivot 27 and pin 34 do not intersect, one being offset from the other for swiveling.

In Figs. 1, 2 and 4 the trailing wheels and mounting therefor are illustrated. Transverse member 12 is channel-shaped having the flanges 135 and mounted in the groove are two pairs of bearing brackets 36, each being secured by the anchorages 13 and 16 which unite the transverse member 12 to the angle members 10 and 15, respectively. Each bracket bearing is substantially T-shaped and terminates at its upper end in a base portion 37 for anchorage and at its lower end in a cylindrical enlargement 38 having an opening therethrough to receive the shaft 39, the shaft being keyed or pinned as at 40 to the bearing and passing through the slot 41 therein. Mounted between adjacent bearing brackets is the trailing wheel 42 and said wheel herein is shown provided with an anti-friction race 43 interposed between shaft 39 and the wheel.

The gates employed with the trailer truck are interchangeable and can be positioned in any suitable pair of sockets 14 secured to the frame 10. The gate consists of a U- shaped pipe or rod 50 having the transverse portion 51 that may be flared outwardly as at 52 to form a handle portion. The arms 50 are secured in spaced relation by the angle straps 53 which have one flange cut away as at 54 and the other flange extended as at 55 and wrapped around the pipe and being secured thereto by the pin or screw bolt 56. Longitudinal movement of the brace or cross member 53 upon the arm 50 is prevented by the pin 56 and inward movement of the arms of the gate is prevented by the horizontal flange of the brace 53 and outward or separating movement is prevented by the extensions 55. Thus, the gate comprises a rigid and rugged construction and is composed of but a few parts. The gate thus formed is received by any pair of sockets 14.

It will be readily apparent that the caster wheel construction with the transverse member 11 can be secured together as a unit separate from the frame and subsequently united thereto. In order to secure the same arrangement relative to the trailing wheels each bracket 36 includes an inwardly extending lug 44 apertured at 45 and the transverse member 12 adjacent thereto includes an opening 46 whereby a bolt 47 passing through the registering openings 45 and 46 through the nut 48 and washer 49, secures the several brackets in proper relation upon the transverse member. Thereafter, when desired, transverse member 12 may be united to the longitudinal braces 15 and the frame 10 through the anchorages 16 and 13, respectively which also anchors the brackets as well. The resultant construction, as shown clearly in Fig. 2, constitutes a truss arrangement for the trailing wheels thereby providing great strength.

The invention claimed is:

1. In a trailer truck, a bed supporting substantially rectangular frame, a plurality of spaced and longitudinally extending braces secured thereto at opposite ends, a plurality of spaced and transversely extending braces secured directly to each longitudinal brace and at opposite ends to opposite sides of the frame, a plurality of tension and compression bars secured at opposite ends to opposite ends of the frame for maintaining the same substantially rectangular in pushing and pulling, and a connection device secured directly to said tension and compression bars.

2. In a trailer truck, the combination of a bed supporting substantially rectangular frame, a pair of bars extending longitudinally of the frame and bearing against the inner face thereof at opposite ends and connected to the outer face thereof to serve as compression and tension members in pushing and pulling, and a connection device at each end of the frame, said connection devices being secured to the frame work through the anchorage of said bars thereto.

In witness whereof, I have hereunto affixed my signature.

WILLIAM H. SIPPEL.